(12) United States Patent
Haraguchi et al.

(10) Patent No.: US 9,706,180 B2
(45) Date of Patent: Jul. 11, 2017

(54) PROJECTION DISPLAY APPARATUS

(71) Applicant: Panasonic Intellectual Property Management Co., Ltd., Osaka (JP)

(72) Inventors: Masahiro Haraguchi, Osaka (JP); Masutaka Inoue, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 3 days.

(21) Appl. No.: 15/062,114

(22) Filed: Mar. 6, 2016

(65) Prior Publication Data

US 2016/0286183 A1 Sep. 29, 2016

(30) Foreign Application Priority Data

Mar. 23, 2015 (JP) .................................. 2015-059011
Feb. 18, 2016 (JP) .................................. 2016-028455

(51) Int. Cl.
*H04N 9/31* (2006.01)
*H04N 9/12* (2006.01)

(52) U.S. Cl.
CPC ......... *H04N 9/3111* (2013.01); *H04N 9/3152* (2013.01); *H04N 9/3188* (2013.01)

(58) Field of Classification Search
CPC .................................................. H04N 9/3185
USPC ....................................................... 348/747
See application file for complete search history.

(56) References Cited

U.S. PATENT DOCUMENTS

| | | | | | |
|---|---|---|---|---|---|
| 5,969,757 | A | * | 10/1999 | Okada | H04N 5/2254 348/219.1 |
| 6,407,726 | B1 | * | 6/2002 | Endo | G09G 3/001 345/32 |
| 2013/0258446 | A1 | * | 10/2013 | Tatsuta | G02B 26/02 359/291 |
| 2014/0049661 | A1 | * | 2/2014 | Leung | G06T 3/4053 348/222.1 |

FOREIGN PATENT DOCUMENTS

JP 4-113308 4/1992

* cited by examiner

*Primary Examiner* — Paulos M Natnael
*Assistant Examiner* — Justin Sanders
(74) *Attorney, Agent, or Firm* — McDermott Will & Emery LLP

(57) ABSTRACT

An optical modulator element modulates incident light from a light source with an input signal. A projection lens magnifies and projects the outgoing light from the optical modulator element. A pixel shift element is disposed between the optical modulator element and the projection lens, and displaces an optical path of the outgoing light from the optical modulator element for shifting a display position of a pixel to be displayed on a screen in a given cycle between a first position and a second position away from the first position by a predetermined distance. A controller controls the pixel shift element such that the pixel shifts between the first position and the second position in either one of a first mode at a shift speed or a second mode at another second shift speed.

9 Claims, 14 Drawing Sheets 3B-3B cross section

PROJECTION DISPLAY APPARATUS

BACKGROUND

Technical Field

The present disclosure relates to a projection display apparatus, and more particularly a projection display apparatus capable of projecting illumination light.

Background Art

Patent literature 1 discloses a projection type display that shifts pixels of a projection image for achieving a high resolution display

CITATION LIST

Patent Literature: Unexamined Japanese Patent Application Publication No. H04-113308

SUMMARY

The present disclosure provides a projection display apparatus that drives an optical modulator element for modulating light from a light source and outputting the resultant image light, and allows a pixel structure (i.e. matrix of pixels) of the optical modulator element not to be easily visible. This structure allows the projection display apparatus to emit natural illumination light when the projection display apparatus is used as a lighting device.

The projection display apparatus of the present disclosure comprises a light source, an optical modulator element, a projection lens, a pixel shift element, and a controller. The optical modulator element modulates incident light from the light source with a input signal. The projection lens magnifies and projects the outgoing light from the optical modulator element. The pixel shift element is disposed between the optical modulator element and the projection lens, and displaces an optical path of the outgoing light from the optical modulator element for shifting a display position of a pixel to be displayed on a screen in a given cycle between a first position and a second position away from the first position by a predetermined distance. The controller controls the pixel shift element such that the pixel shifts between the first position and the second position in either one of a first mode at a shift speed or a second mode at another second shift speed.

In the case of using projection light as illumination light, the structure discussed above allows a pixel structure not to be easily visible, so that a feel of spotlight can be reproduced.

DETAILED DESCRIPTION OF PREFERRED EMBODIMENTS

The exemplary embodiments of the present disclosure are detailed hereinafter with reference to the accompanying drawings. Descriptions detailed more than necessary are sometimes omitted. For instance, well-known facts are introduced without detailed descriptions, or substantially identical structures to each other need not duplicating descriptions in order to avoid redundant descriptions and for ordinary skilled person in the art to understand the present disclosure with ease.

The accompanying drawings and the descriptions below are provided to the ordinary skilled person in the art to fully understand the present disclosure, and these materials do not intend to limit the scope of the claims.

The drawings schematically illustrate the subjects, and reduced scales of dimensions of the subjects are different from the actual ones, so that specific dimensions shall be construed considering the descriptions below. The reduced scales and dimensional relations between each drawing are sometimes different.

First Exemplary Embodiment

The first exemplary embodiment is demonstrated hereinafter with reference to FIG. 1-FIG. 10B.

1-1. Structure

Figure 1:
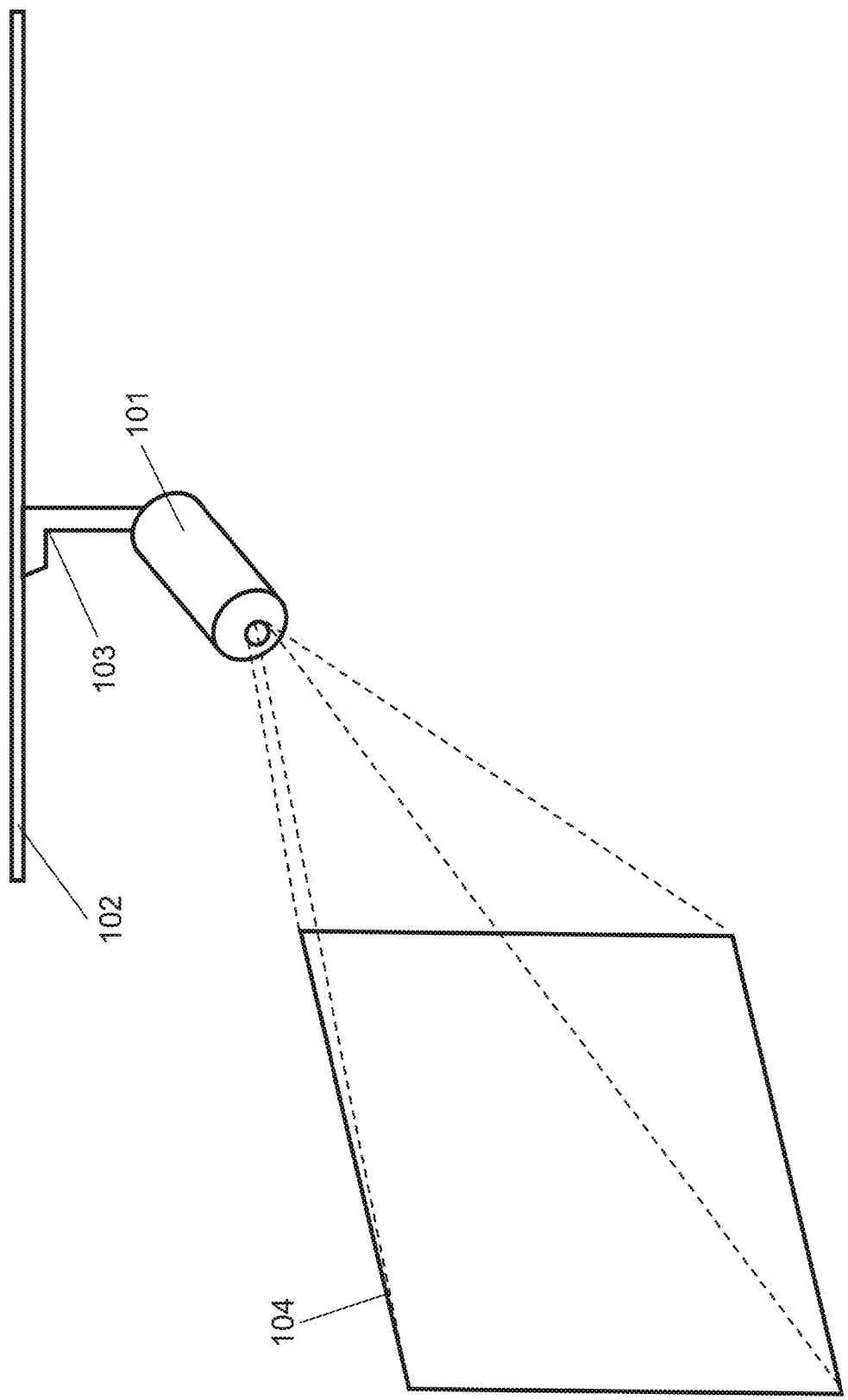
FIG. 1 illustrates an actual use of the projection display apparatus in accordance with the present disclosure.

A structure of a projection display apparatus in accordance with the first embodiment is demonstrated hereinafter with reference to FIG. 1-FIG. 5. FIG. 1 illustrates an actual use of projection display apparatus 101 of the present disclosure. Projection display apparatus 101 has a cylindrical appearance, and is mounted to rail 102 via joint 103 that can adjust a projection angle. Rail 102 is fixed to a ceiling. Projection display apparatus 101 thus prepared will project image light or illumination light onto projection screen 104.

To be more specific, projection display apparatus 101 of the present disclosure has a video mode and an illumination mode. In the video mode, projection display apparatus 101 projects a video signal supplied from a PC (personal computer) or a DVD reproducer as a projection video onto projection screen 104, while in the illumination mode, projection display apparatus 101 projects an illumination signal as illumination light onto projection screen 104.

Figure 2:
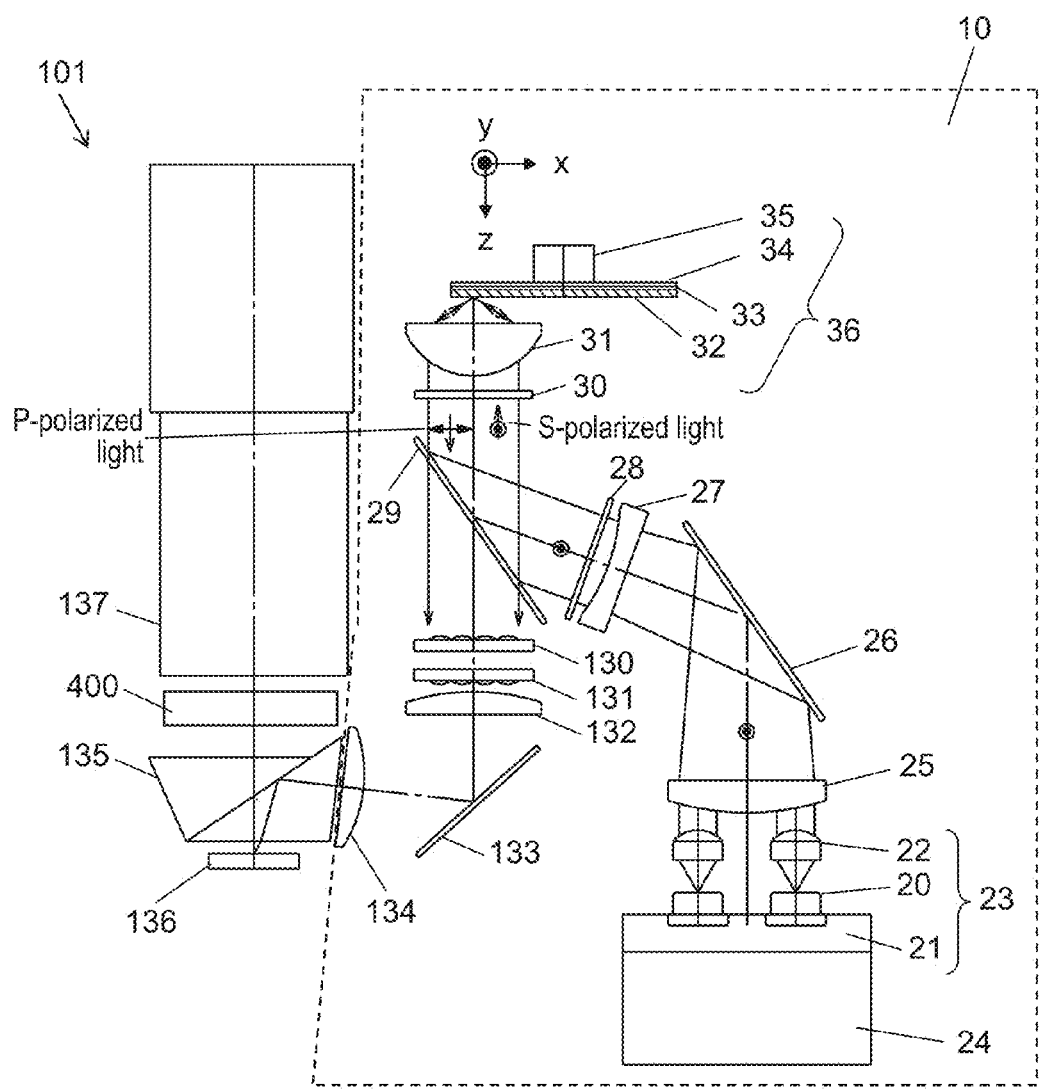
FIG. 2 illustrates an optical structure of the projection display apparatus in accordance with the present disclosure.

FIG. 2 shows an optical structure of projection display apparatus 101. Solid state light source unit 23 includes semiconductor laser 20 that is a solid light source and emits a blue-color laser light, and radiator plate 21, condenser lens 22 that is a collimate lens for condensing the laser light from semiconductor laser 20 and converting it into parallel light. Heat sink 24 is mounted to radiator plate 21. Blue light emitted from semiconductor laser 20 has linear polarized light, namely, S-polarized light in terms of polarized direction.

The light from condenser lens 22 travels through lens 25, and reflects on total reflection mirror 26, then travels through lens 27, diffuser 28, and enters dichroic mirror 29 that has properties of reflecting blue light of S-polarized light and transmitting blue light of P-polarized light as well as emission light from fluorescent material. Diffuser 28 is made of flat glass plate on which surface fine peaks and valleys are formed for diffusing the laser light.

The blue light, transmitted through diffuser 28, of S-polarized light reflects on dichroic mirror 29, and transmits through a phase-differential plate (i.e. ¼ wavelength plate 30) where S-polarized light is converted into circularly polarized light which then enters condenser lens 31. The blue light condensed by condenser lens 31 radiates fluorescent board 32 of fluorescent wheel device 36. FIG. 2 illustrates luminous fluxes emitted from solid state light source unit 23 and polarization directions of light with respect to dichroic mirror 29 in x-axis, y-axis, and z-axis.

Figure 3A:
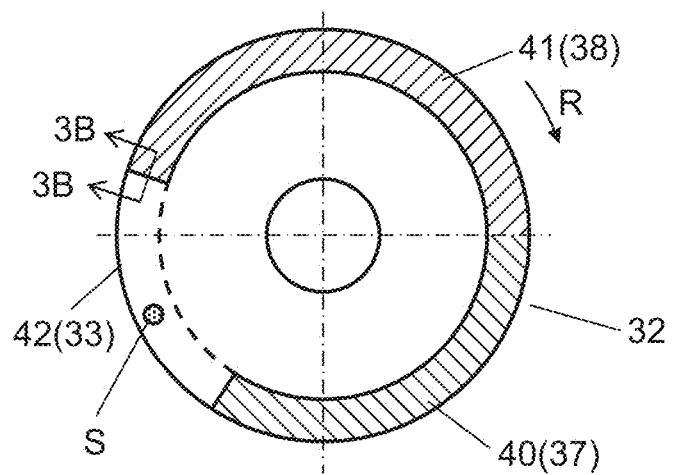
FIG. 3A and FIG. 3B illustrate a fluorescent substrate used the projection display apparatus in accordance with the present disclosure.

As FIG. 3A shows, circular fluorescent board 32 has a region divided into three segments (R, G, B), and two segments out of the three form fluorescent region 41 to which green phosphor 38 is applied, and fluorescent region 40 to which red phosphor 37 is applied. The remaining one segment B forms reflective region 42 on which only reflective film 33 is formed. Green phosphor 38 that emits fluorescent light including a green component employs Y3Al5O12: Ce3+, and red phosphor 37 that emits fluorescent light including a red component employs CaAlSiN3: Eu2+. Reflective film 33 formed on reflective region 42 employs metal film of aluminum.

Figure 3B:
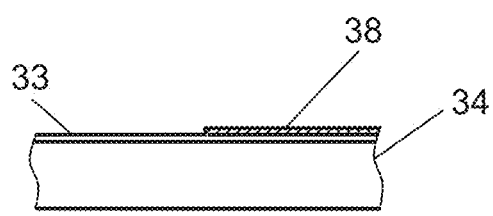

FIG. 3B is a sectional view of fluorescent region 41 and reflective region 42 cut along line 3B-3B in thickness direction in FIG. 3A. Fluorescent board 32 is formed this way: reflective film 33 is formed on aluminum plate 34, and a fluorescent layer is formed on this reflective film 33 by application printing with a thickness of 0.1-0.2 mm. Light incident into fluorescent regions 40, 41 of the fluorescent layer emits fluorescent light of green and of red, then these lights outgo from fluorescent board 32. Light emitting from fluorescent regions 40 and 41 at reflective film 33 side reflects on reflective film 33, and outgoes from fluorescent board 32. The blue light of the circularly polarized light entering reflective film 33 of reflective region 42 becomes reversed-circularly polarized light, and outgoes from fluorescent board 32.

Fluorescent board 32 is mounted with motor 35, which rotates board 32. Fluorescent wheel device 36 is thus formed of fluorescent board 32 with motor 35 being mounted.

The blue light transmitting through ¼ wavelength plate 30 is condensed by condenser lens 31 to form spot S of which diameter is smaller than a phosphor width near the edges of fluorescent board 32. This mechanism allows the blue light from condenser lens 31 to radiate red phosphor 37, green phosphor 38, and reflective film 33 of reflective region 42 sequentially when fluorescent board 32 is rotated by motor 35 in direction R. Irradiating green phosphor 38 with the blue light prompts green phosphor 38 to emit green fluorescent light, irradiating red phosphor 37 with the blue light prompts red phosphor 37 to emit red fluorescent light. These green light and red light are unpolarized light, and are condensed by condenser lens 31. The blue light that has been reflected by reflective film 33 and become reversed-circularly polarized light is condensed by condenser lens 31.

As FIG. 2 shows, the green light and the red light condensed by condenser lens 31 transmit through ¼ phase-differential plate 30 and dichroic mirror 29 without any modification. The reversed-circularly polarized light condensed by condenser lens 31 is converted into P-polarized light by ¼ phase-differential plate 30, and transmits through dichroic mirror 29. As discussed above, rotation of fluorescent board 32 by motor 35 allows red color light, green color light, and blue color light to outgo sequentially from board 32.

The light transmitting through dichroic mirror 29 enters first lens array plate 130 formed of multiple lens elements, and the light beam incident into first lens array plate 130 is divided into a large number of light beams, which converge into second lens array plate 131 formed of multiple lens elements. The lens elements of first lens array plate 130 forms an open shape similar to DMD (digital micro-mirror device) 136. The lens elements of second lens array plate 131 have such a focal distance that first lens array plate 130 can be in a conjugate relation with DMD 136.

The light from second lens array plate 131 enters superposing lens 132, which radiates the light from each one of the lens elements of first lens array 131 onto DMD 136 in superposing manner. The light from superposing lens 132 is reflected by mirror 133, and then enters field lens 134, which efficiently condenses illumination light into projection lens 137. The illumination light from field lens 134 enters total internal reflecting prism 135. As discussed above, the section surrounded by broken lines in FIG. 2 forms illumination device 10.

Total internal reflecting prism 135 is formed of two prisms, and a thin air-layer is formed in an interface of the two prisms, and this air-layer totally reflects incident light at an angle equal to or greater than a critical angle. Total internal reflecting prism 135 reflects the illumination light from field lens 134 for illuminating DMD 136, and yet transmits the projection light outgoing from DMD 136.

DMD 136 deflects a light beam, necessary for forming an image, out of the incident light in response to a video signal, and the light beam transmitting through total internal reflecting prism 135 enters projection lens 137 via pixel shift element 400. Projection lens 137 magnifies and projects the image light that has been modulated and formed by DMD 136 onto a screen. DMD 136 is an example of an optical modulator element. Illumination device 10 employs two lens array panels 130 and 131 as an integrator optical system for obtaining uniformity in a projection image; however, the system can be formed of a rod instead.

Figure 4:
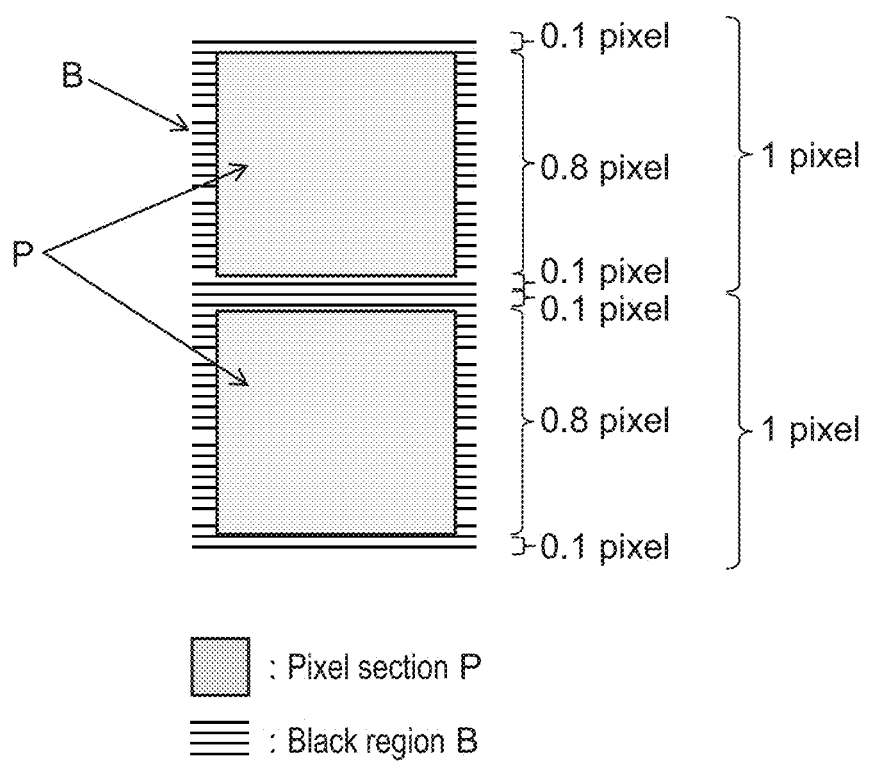
FIG. 4 shows a pixel structure of an optical modulator element of the projection display apparatus in accordance with the present disclosure.

Next, a pixel structure of the optical modulator element, namely, DMD 136 is described hereinafter. FIG. 4 illustrates the pixel structure of DMD 136. As FIG. 4 shows one pixel is formed of pixel section P and black region B that are observed between pixel sections P adjacent to each other. In this embodiment, as shown in FIG. 4, one pixel is formed of pixel section P of 0.8 pixel and black region B of 0.2 pixel.

Figure 5:
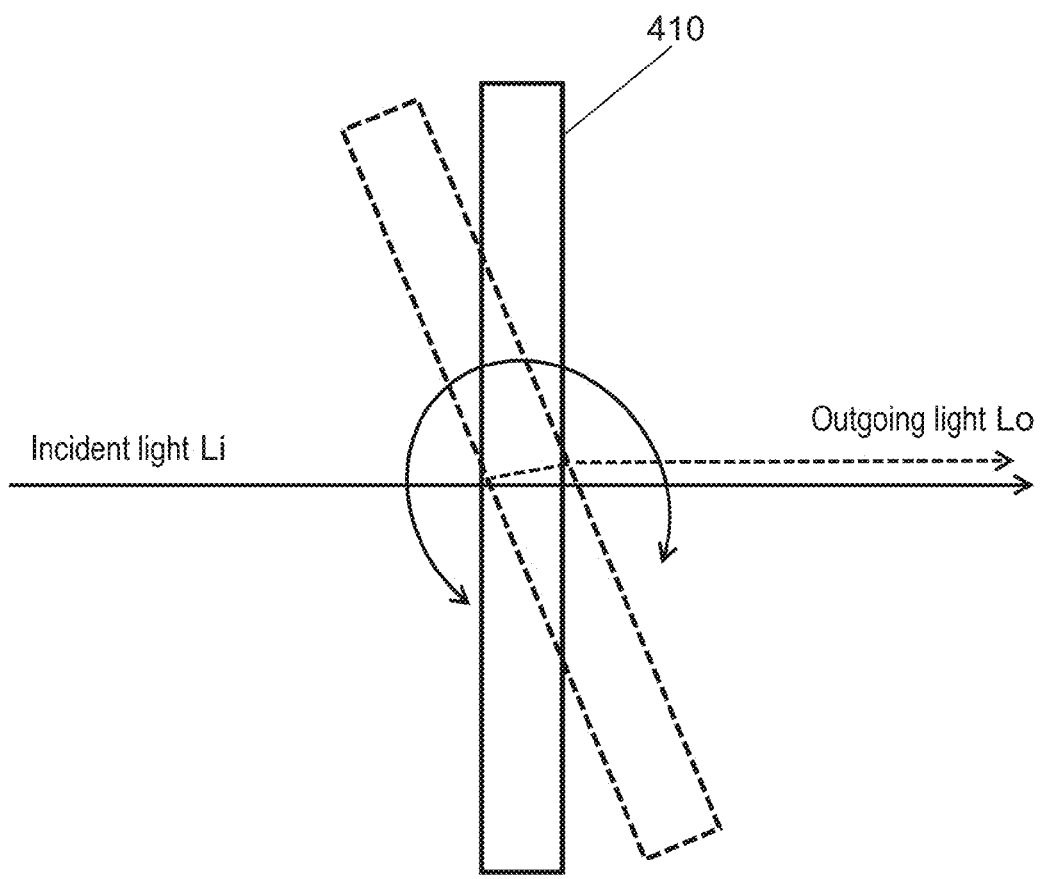
FIG. 5 illustrates a pixel shift element to be used in the projection display apparatus in accordance with the present disclosure.

FIG. 5 illustrates a principle of actions of pixel shift element 400 which is formed of parallel flat glass 410 and a driver (not shown) that rocks and drives parallel flat glass 410. When a surface of parallel flat glass 410 intersects with incident light Li at right angles, incident light Li does not deflect at the interface between parallel flat glass 410 and air, but travels straight. Incident light Li transmits through parallel flat glass 410 without being deflected, and at the interface where incident light Li outgoes to the air, incident light Li does not deflect but travels straight because parallel flat glass 410 includes parallel flat faces, and yet the light intersects with the interface at right angles. In the case of incident light Li being image light, the structure discussed above allows a display position of a pixel of the image not to shift.

During the driving of parallel flat glass 410 by the driver as shown in FIG. 5 with broken lines, when parallel flat glass 410 does not with incident light Li at right angles, incident light Li deflects on the interface between parallel flat glass 410 and the air. Incident light Li deflects and then enters parallel flat glass 410, then travels through parallel flat glass 410, and outgoes to the air from the interface, on which incident light Li deflects too because parallel flat glass 410 has parallel surfaces and the light beam does not intersect with the interface at right angles.

Since a deflection angle at entering parallel flat glass 410 is equal to a deflection angle at outgoing from parallel flat glass 410, in the case of incident light Li being image light, the image light of outgoing light Lo shifts in parallel with a tilt direction of parallel flat glass 410. As a result, the display position, of the pixel of the image output from parallel flat glass 410 and projected onto the screen, is shifted.

Figure 6:
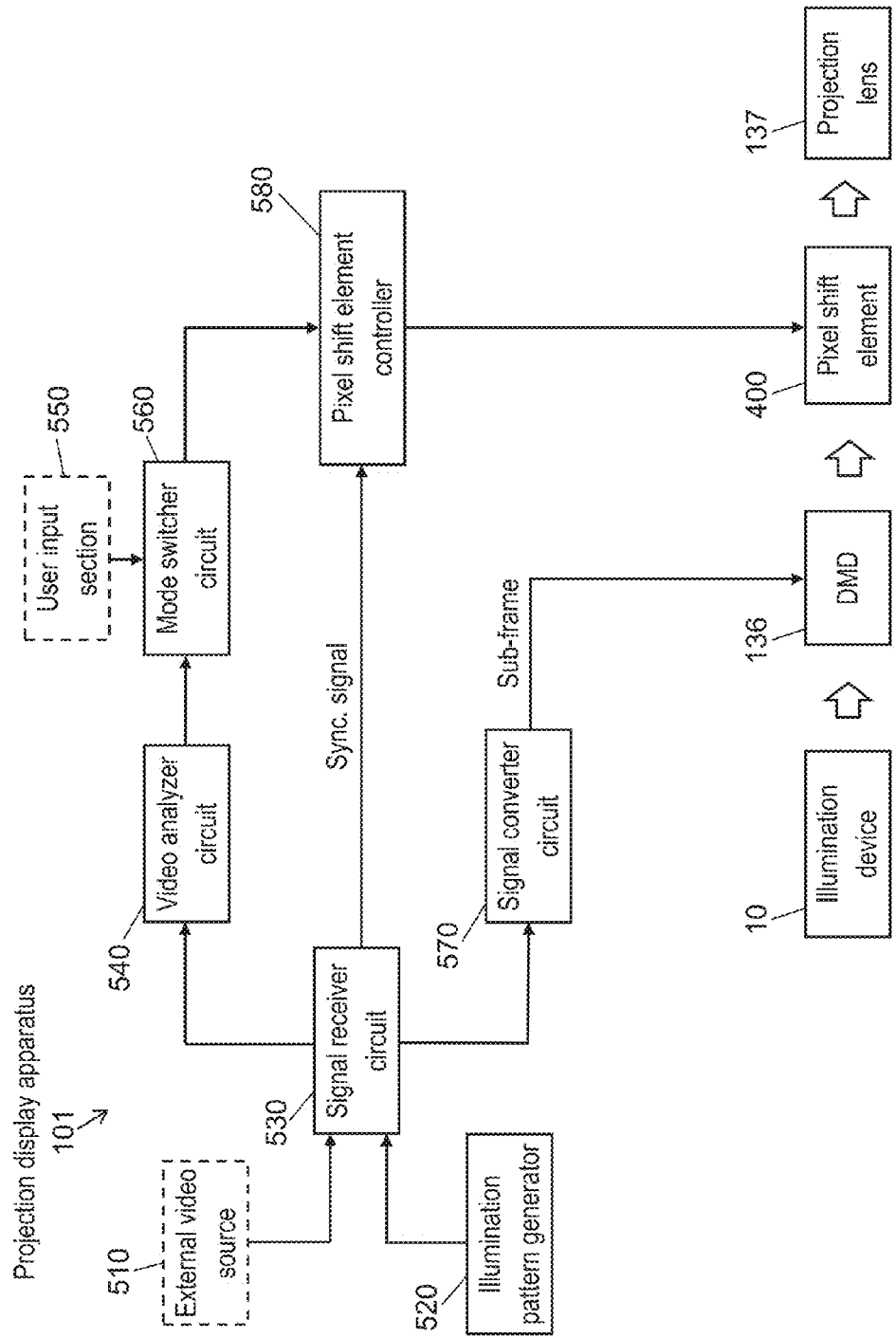
FIG. 6 is a block diagram of the projection display apparatus in accordance with a first embodiment.

FIG. 6 is a block diagram of an essential section of projection display apparatus 101 in accordance with the first embodiment. Video signals or illumination signals are input to signal receiver circuit 530. The video signals are supplied from external video source 510, such as a DVD reproducer or a PC, connected to projection display apparatus 101, and the illumination signals are supplied from illumination pattern generator 520 provided to projection display apparatus 101. Signal receiver circuit 530 supplies the signals input therein to video analyzer circuit 540 and signal converter circuit 570. Video analyzer circuit 540 analyzes whether the signal input therein is the video signal from external video source 510 or the illumination signal from illumination pattern generator 520, and then supplies the analysis result to mode switcher circuit 560. To be more specific, video analyzer circuit 540 detects a presence of a high-frequency component in the input signal, and when it detects the presence thereof, the input signal is determined as the video signal, and when it does not detects the presence, the input signal is determined as the illumination signal. Video analyzer circuit 540 is an example of a spatial frequency detector.

In response to the analysis result, mode switcher circuit 560 issues a command for pixel shift element controller 580 to operate in the video mode or in the illumination mode. User input section 550 allows a user to manually operate mode switcher circuit 560 for pixel shift element controller 580 to work in the video mode or in the illumination mode.

Signal conversion circuit 570 converts the signal input therein into multiple sub-frame signals matching with the number of pixels of DMD 136, and then supplies the sub-frame signals to DMD 136. Pixel shift element controller 580 is an example of the controller, and can be formed of a micro-processor.

DMD 136 modulates the light from illumination device 10 with the sub-frame signals. The modulated light from DMD 136 is supplied to pixel shift element 400, which is driven by pixel shift element controller 580, and changes an optical path of the modulated light supplied from DMD 136 for shifting the pixels, and then the modulated light is magnified and projected onto the screen from projection lens 137.

1-2. Pixel Shifting

Figure 7:
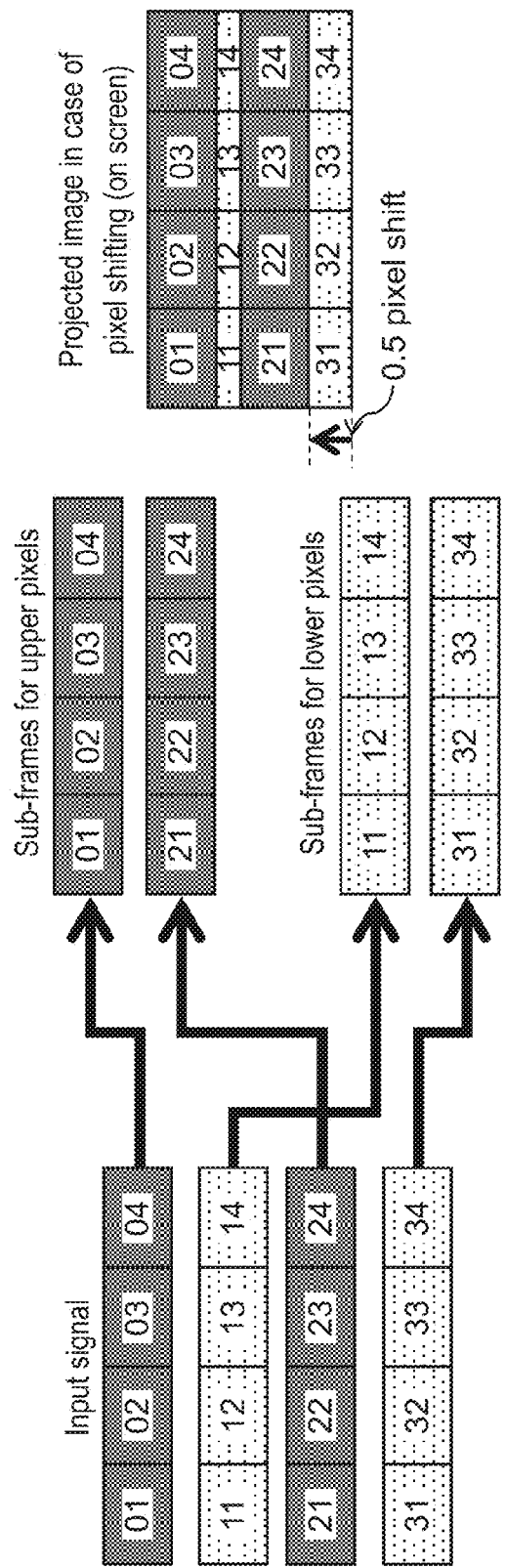
FIG. 7 shows a method for dividing an input signal into sub-frames of the projection display apparatus in accordance with the first embodiment.

An example, in which pixels forming the image light or the illumination light are shifted vertically, is demonstrated hereinafter. Signal converter circuit 570 divides each pixel of the input signal into sub-frames in response to a direction of shifting pixels of the input signal. FIG. 7 illustrates a method for dividing the pixels to be shifted in vertical direction into sub-frames. In this example, the input signal is formed of 4×4 pixels. In the case of shifting the pixels in vertical direction, sub-frames to be used for upper pixels are formed by extracting odd-numbered lines from the input signal, and sub-frames to be used for lower pixels are formed by extracting even-numbered lines from the input signal. In the case of shifting the pixels in right-left direction, odd columns are extracted for left pixels, and even columns are extracted for right pixels.

FIG. 7 illustrates an example of pixel shifting in vertical direction. The sub-frames to be used for upper pixels (2×4 pixels) and the sub-frames to be used for lower pixels (2×4 pixels) are generated from the input signal, and they are supplied alternately to DMD 136. In other words, sub-frames having pixels equal quantity to the pixels of DMD 136 are generated, and these sub-frames are supplied to DMD 136, which is then driven with a doubled frequency of the input signal.

The mechanism discussed above allows displaying a projected image on the screen in such a state where the upper pixels are shifted upward by 0.5 pixel of the optical modulator element with respect to the lower pixel due to pixel shift element 400 as shown in FIG. 7. As FIG. 6 shows, signal receiver circuit 530 supplies a sync. signal to pixel shift element controller 580, which thus controls pixel shift element 400 by synchronizing with the input signal.

Video Mode

A reception of signals supplied from external video source 510 at signal receiver circuit 530 prompts video analyzer circuit 540 to analyze the signals and then provides mode switcher circuit 560 with an analysis result that the signals are video signals. A reception of the analysis result prompts mode switcher circuit 560 to issue a command to pixel shift element controller 580 such that pixel shift element 400 should be driven in the first mode (i.e. video mode). A switch to the video mode can be done manually by a user with user input section 550.

Figure 8A:
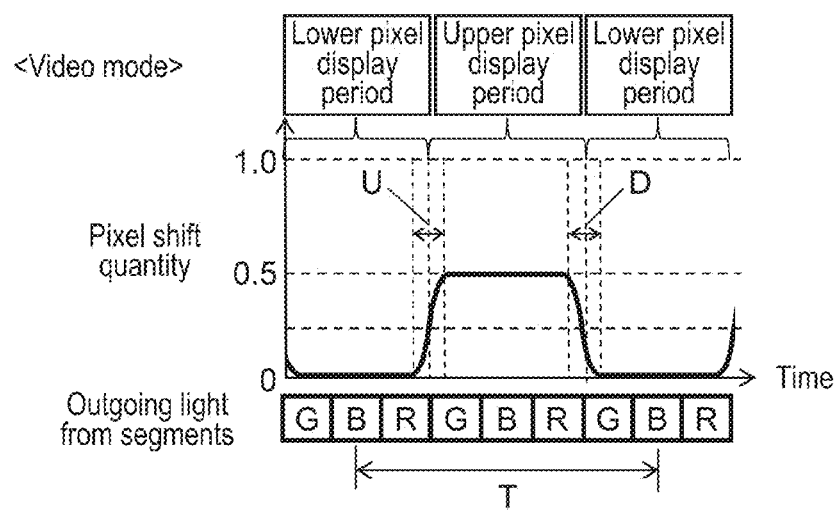
FIG. 8A illustrates performance of pixel shift in a video mode of the projection display apparatus in accordance with the first embodiment.
Figure 8B:
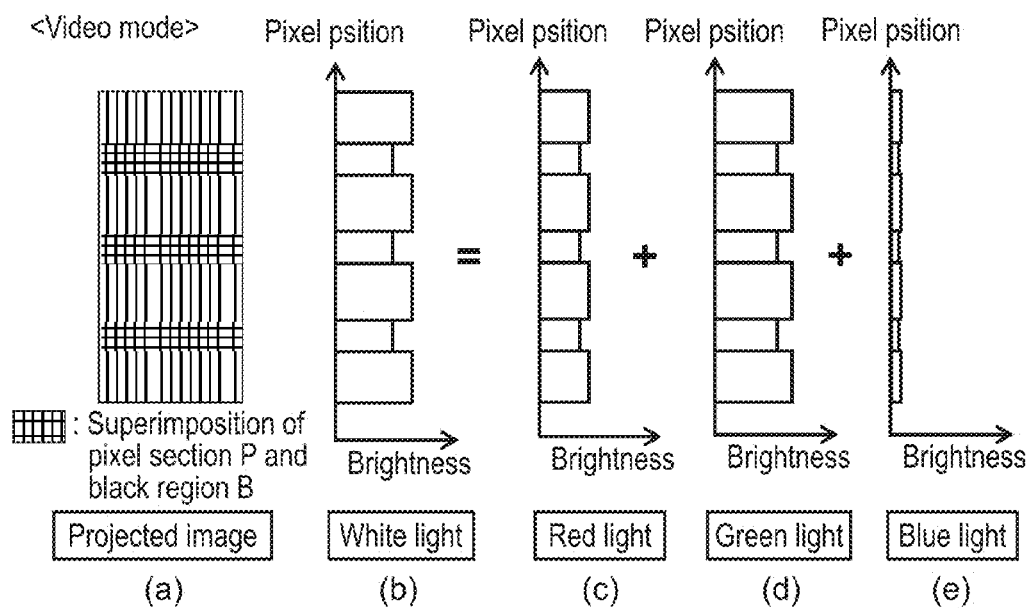
FIG. 8B shows brightness levels of a projected image in the video mode of the projection display apparatus in accordance with the first embodiment.

FIG. 8A and FIG. 8B illustrate performance of pixel shifting in the video mode. FIG. 8A shows pixel shift quantity with respect to time, and FIG. 8B shows brightness levels of a projected image. The brightness level of white light shown in FIG. 8B (b) can be broken down into a brightness level of segment R that emits red light as shown in FIG. 8B (c), a brightness level of segment G that emits green light as shown in FIG. 8B (d), and a brightness level of segment B that emits blue light as shown in FIG. 8B (e).

In this embodiment, FIG. 8A exemplifies the timings of emitting the red, green, and blue lights in the case where the blue light is located at the center of a lower pixel display period and at the center of an upper pixel display period. This embodiment, however, does not limit the relation between the emission timing of the red, green, and blue lights and a phase of a control waveform of pixel shifting. This relation will be detailed in the second embodiment.

As FIG. 8A shows, in the video mode, pixel shift element 400 is controlled such that the pixel shift is done sharply from the lower pixel to the upper pixel in order to maximize a feel of resolution. In this pixel shift, the pixel shift quantity is equivalent to 0.5 pixel.

To be more in detail, as FIG. 8A shows, the pixel shift performs such that a pixel shifts between the first position (pixel shift quantity is 0) and the second position (pixel shift quantity is 0.5) so that a waveform that shows time vs. pixel shift quantity can draw a rectangular shape. The pixel sharply shifts in rising period U and in falling period D of the rectangular waveform. In other words, pixel shift element controller 580 controls pixel shift element 400 such that the pixel shifts at a high speed. The pixel shift discussed above is referred to as a second shift performance. As FIG. 8A shows, one cycle T covers a span from a middle point of the lower pixel display period, through the upper pixel display period, to a middle point of the next lower pixel display period.

Under this control, a projection of an image of 100% white brightness, which is obtained by turning on every DMD 136, onto the screen will cause an appearance of superimposition of pixel section P and black region B in parts of the projected image as shown in FIG. 8B (a). The brightness of these superimposed sections lowers as shown in FIG. 8B (b). This phenomenon is equivalent to what is shown in FIG. 8 (c)-(e), namely the brightness of each of the red light, green light, and blue light is stepped down.

When a still image of mono color like the illumination mode is displayed in this video mode, lateral stripes become conspicuous because of the superimposition of black region B.

In the video mode, the waveform of pixel shift quantity shown in FIG. 8A is not necessarily a complete rectangular wave, however the rising period U and the falling period D are preferably as short as possible.

Illumination Mode 1

A reception of a signal supplied from illumination pattern generator 520 at signal receiver circuit 530 prompts video analyzer circuit 540 to analyze the signal, and then supplies an analysis result that the signal is an illumination signal to mode switcher circuit 560, which then issues a command to pixel shift element controller 580 that pixel shift element 400 should be driven in the second mode, namely in illumination mode 1. A switchover to illumination mode 1 can be done by a user manually with user input section 550.

Figure 9A:
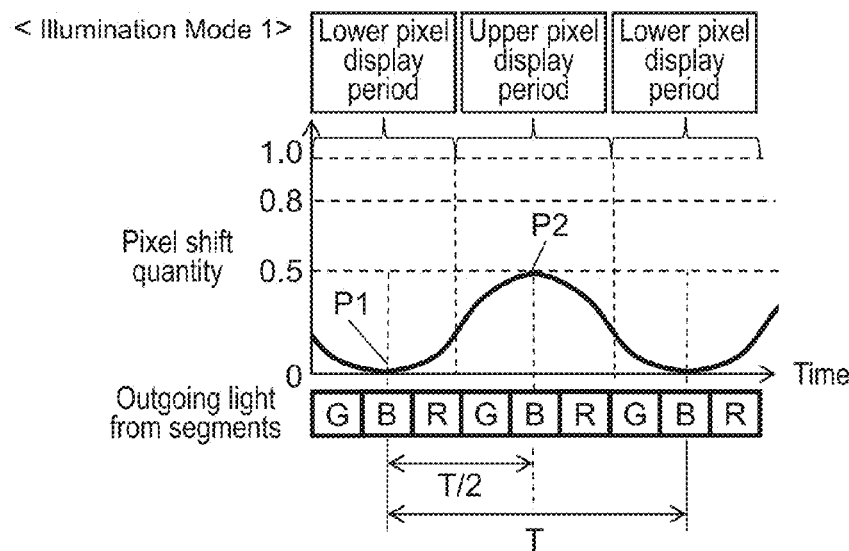
FIG. 9A illustrates performance of pixel shift in an illumination mode of the projection display apparatus in accordance with the first embodiment.
Figure 9B:
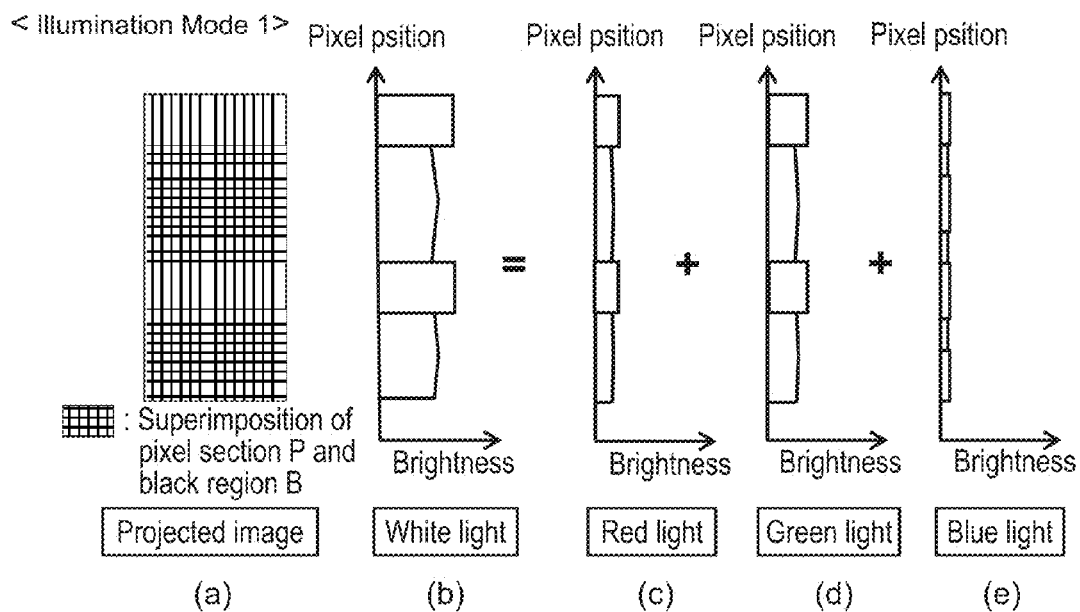
FIG. 9B illustrates brightness levels of a projected image in the illumination mode of the projection display apparatus in accordance with the first embodiment.

FIG. 9A and FIG. 9B illustrate performance of pixel shift in illumination mode 1. FIG. 9A shows a relation of time vs. pixel shift quantity, and FIG. 9B shows brightness levels of a projected video. The brightness level of white light shown in FIG. 9B (b) can be broken down into a brightness level of segment R that emits red light as shown in FIG. 9B (c), a brightness level of segment G that emits green light as shown in FIG. 9B (d), and a brightness level of segment B that emits blue light as shown in FIG. 9 (e).

As FIG. 9A shows, in illumination mode 1, in order to make black regions B between pixels hardly visible, pixel shift element 400 is controlled such that the pixel shift from the lower pixel to the upper pixel is done moderately rather than in the video mode shown in FIG. 8A during a given cycle T. The pixel shift quantity in this case is 0.5 pixel that is identical to the pixel shift in the video mode. Since the pixel shift from the lower pixel to the upper pixel is done moderately, this pixel shift draws a locus of sign-wave having a peak-to-peak width equal to 0.5 pixel.

To be more specific, as FIG. 9A shows, the pixel shifts from the first position where pixel shift quantity is 0 (zero) to the second position where pixel shift quantity is 0.5 pixel so that the waveform of time vs. pixel shift quantity draws a sign-wave. In other words, the pixel reaches peak P1 at the middle point in the lower pixel display period and arrives at the first position, and reaches peak P2 at the middle point in the upper pixel display period and arrives at the second position. As discussed above, pixel shift element controller 580 controls pixel shift element 400 such that the pixel moderately shifts in the peak-to-peak (P1-P2) within a half cycle (T/2) of a sign-wave that is a locus drawn by the pixel. This pixel shift is referred to as a first shift performance.

The comparison of FIG. 8A with FIG. 9A proves that a shift speed of the pixel in the video mode is different from a shift speed of the pixel in the illumination mode. To be more specific, the shift speed in illumination mode 1 is slower than the shift speed in the video mode. This fact should be kept in mind.

Under this control, a projection of an image of 100% white brightness, which is obtained by turning on every DMD 136, onto the screen will expand the area superimposed by black regions B and pixel section P in the projected image as shown in FIG. 9B (a), because black region B of 0.2 pixel moderately shifts by 0.5 pixel. The brightness of the projected image at the superimposed area slightly lowers as shown in FIG. 9B (b). This phenomenon is equivalent to what is shown in FIG. 9 (c)-(e), namely, the brightness of each of the red light, green light, and blue light is scarcely stepped down.

When illumination light of mono color is displayed in this illumination mode 1, the lateral stripes caused by black region B become less conspicuous, so that more natural illumination light is obtainable.

Illumination Mode 2

A reception of a signal supplied from illumination pattern generator 520 at signal receiver circuit 530 prompts video analyzer circuit 540 to analyze the signal, and then supplies an analysis result that the signal is an illumination signal to mode switcher circuit 560, which then issues a command to pixel shift element controller 580 that pixel shift element 400 should be driven in the second mode, namely, in illumination mode 2. A switchover to illumination mode 2 can be done by a user manually with user input section 550.

Figure 10A:
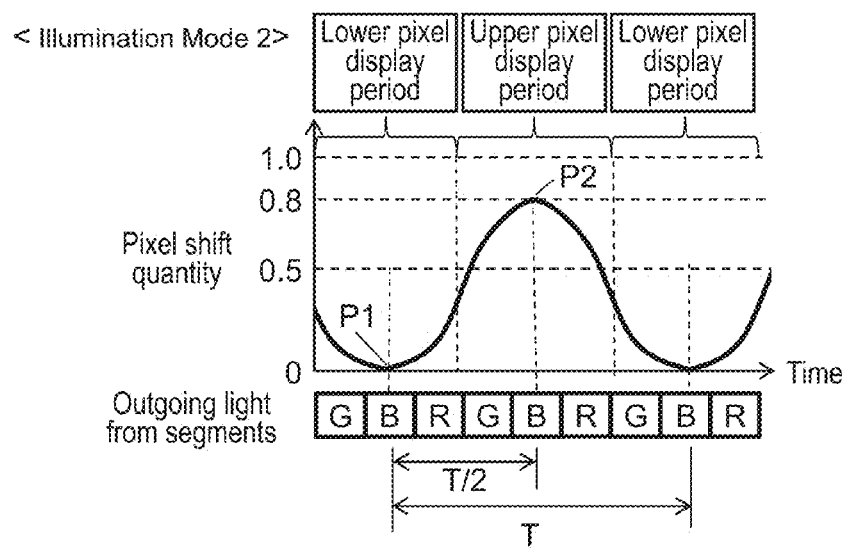
FIG. 10A illustrates performance of pixel shift in another illumination mode of the projection display apparatus in accordance with the first embodiment.
Figure 10B:
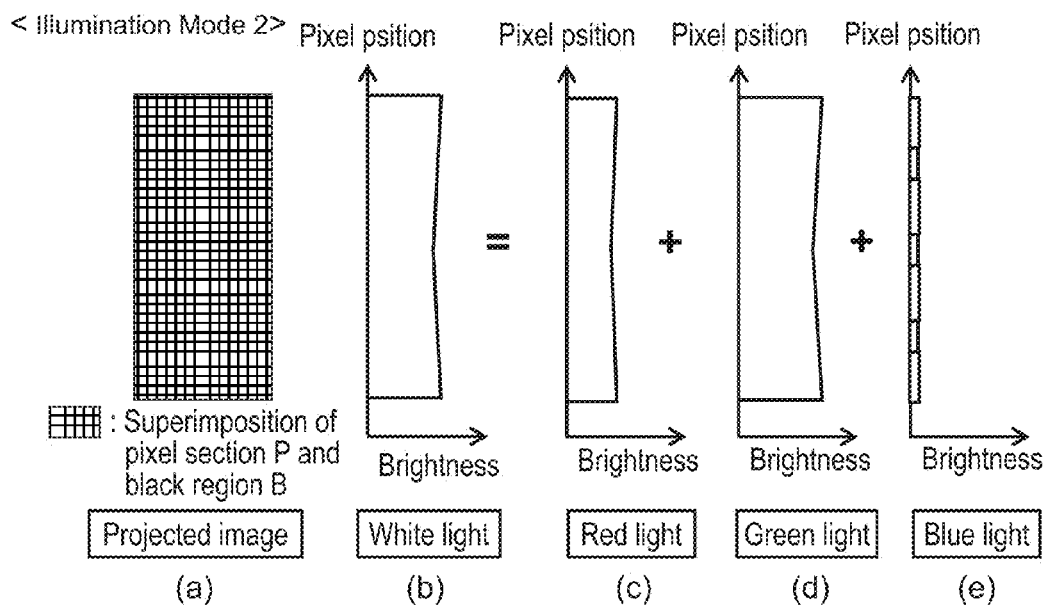
FIG. 10B illustrates brightness levels of a projected image in the another illumination mode of the projection display apparatus in accordance with the first embodiment.

FIG. 10A and FIG. 10B illustrate performance of pixel shift in illumination mode 2. FIG. 10A shows a relation of time vs. pixel shift quantity, and FIG. 10B shows brightness levels of a projected image. The brightness level of white light shown in FIG. 10B (b) can be broken down into a brightness level of segment R that emits red light as shown in FIG. 10B (c), a brightness level of segment G that emits green light as show in FIG. 10B (d), and a brightness level of segment B that emits blue light as shown in FIG. 10 (e).

As FIG. 10A shows, in illumination mode 2, pixel shift element 400 is controlled such that the pixel shift from the lower pixel to the upper pixel should be done moderately, as done in illumination mode 1 shown in FIG. 9A, in order to make a pixel structure hardly visible. However, this case differs from illumination mode 1 in pixel shift quantity, namely in this case the pixel is shifted by 0.8 pixel instead of 0.5 pixel. Since the pixel shift between the lower pixel and the upper pixel is done moderately, the locus of this pixel shift draws a sign-wave of which peak-to-peak spans a width equal to 0.8 pixel.

To be more in detail, as FIG. 10A shows, the pixel shifts from the first position where pixel shift quantity is 0 (zero) to the second position where pixel shift quantity is 0.8 pixel so that the waveform of time vs. pixel shift quantity draws a sign-wave. In other words, the pixel reaches peak P1 at the middle point in the lower pixel display period and arrives at the first position, and reaches peak P2 at the middle point in the upper pixel display period and arrives at the second position. As discussed above, pixel shift element controller 580 controls pixel shift element 400 such that the pixel moderately shifts in the peak-to-peak (P1-P2) within a half cycle (T/2) of the sign-wave that is a locus drawn by the pixel. This pixel shift is the same as the first shift performance, and greater pixel shift quantity is observed than that of the first shift performance in the illumination mode.

A pixel structure, in which a width ratio of a pixel region vs. a black region between the pixels is 0.8:0.2 as shown in FIG. 4, allows the pixel shift between the lower pixel and the upper pixel to draw sign-wave of which peak-to-peak spans a width equal to 0.8 pixel. This sign-wave represents the ratio of time vs. pixel shift quantity (=0.8 pixel). As FIG. 10A shows, the pixel moderately shifts.

A reason why the pixel structure becomes visible is a brightness difference between pixel sections of the optical modulator element and black regions B among pixel sections P. To overcome this drawback, in the illumination mode, the pixel moderately shifts by a width equal to 0.8 pixel for black region B between the pixels to scan the entire pixel region, so that every region of the optical modulator element has a uniform brightness.

As FIG. 8A and FIG. 10A show that a shift speed of the pixel in the video mode is different from a shift speed of the pixel in illumination mode 2. To be more specific, the shift speed in illumination mode 2 is slower than the shift speed in the video mode. This fact should be kept in mind.

Under this control, a projection of an image of 100% white brightness, which is obtained by turning on every DMD 136, onto the screen will expand the area superimposed by black regions B and pixel section P in the projected image overall as shown in FIG. 10B (a), because black region B of 0.2 pixel moderately shifts by 0.8 pixel. The brightness of the projected image becomes uniform as shown in FIG. 10B (b). This phenomenon is equivalent to what is shown in FIG. 10 (d)-(f), namely the brightness of each of the red light, green light, and blue light becomes uniform and no step-down in brightness of each color light is observed.

When illumination light of mono color is displayed in this illumination mode 2, the brightness difference caused by black region B is not observed, so that still more natural illumination light is obtainable.

1-3. Advantage

This first embodiment proves that the illumination mode makes the pixel structure hardly visible, thereby achieving a spotlight feel, and the video mode achieves a feel of resolution better than the resolution of the optical modulator element.

Second Exemplary Embodiment 2-1. Structure

The second embodiment is demonstrated hereinafter with reference to FIG. 11A, FIG. 11B, FIG. 12A, and FIG. 12B. This second embodiment differs from the first embodiment in the control action of pixel shift element controller 580. The structure per se of the projection display apparatus remains the same as that of projection display apparatus 101 in accordance with the first embodiment, so that descriptions duplicated are omitted here.

2-2. Pixel Shifting

As already described in the first embodiment, fluorescent board 32 emits red, green, and blue lights sequentially, so that these color lights display an image in a pixel shift state different from each other.

Figure 11A:
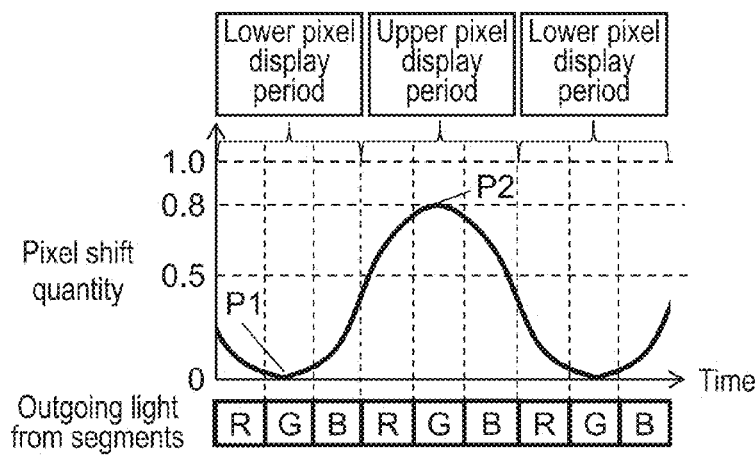
FIG. 11A illustrates performance of pixel shift in an illumination mode of a projection display apparatus in accordance with a second embodiment.
Figure 11B:
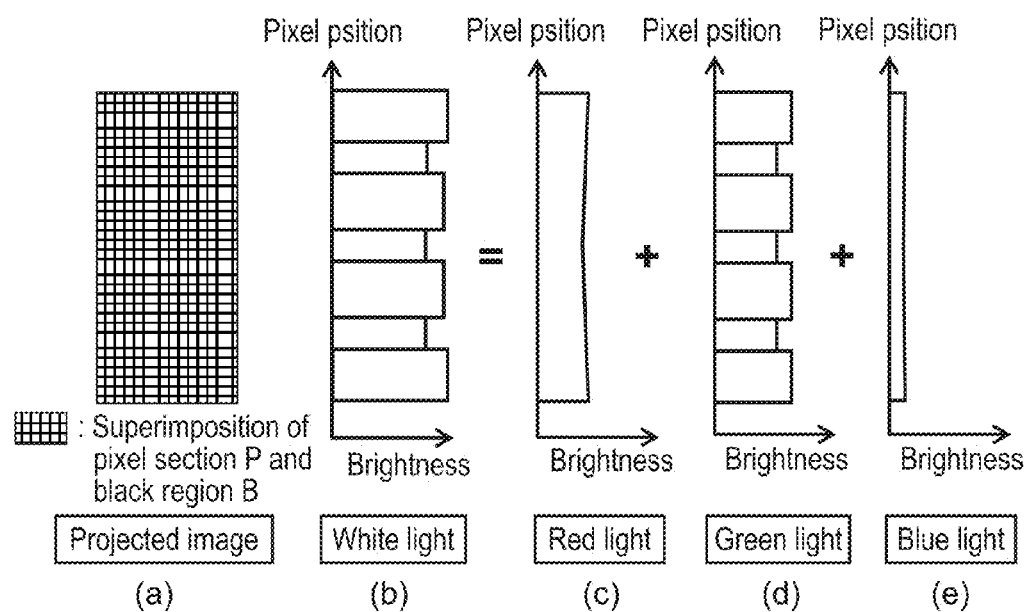
FIG. 11B illustrates brightness levels of a projected image in the illumination mode of the projection display apparatus in accordance with the second embodiment.

The control in illumination mode 2 in accordance with the first embodiment, namely the control of moderate pixel shift by 0.8 pixel, causes the following problem: as FIG. 11A shows, in a phase of waveform representing the pixel shift control in which green light is located at the center of the lower pixel display period and at the center of the upper pixel display period, so that periods in which quantities of pixel shift are close to 0 (zero) pixel and 0.8 pixel are allocated to the green light. The green light thus shows a feel of resolution as if the pixel sharply shifts. In other words, as FIG. 11B (d) shows, the pixel structure of the green light becomes more visible than others. Considering the visual appreciation of the human being, green light has a brightness higher than red light and blue light, so that the green light is more visible than the others. This is preferable for increasing the feel of resolution; however, in the illumination mode, the visible pixel structure is not preferable. Since green light has higher visual appreciation than the others, the pixel structure becomes visible even in white light as shown in FIG. 11B (b).

Red light and blue light are located at leading portions and tailing portions of the lower pixel display period and the upper pixel display period as shown in FIG. 11A, so that these lights have small quantities of pixel shift. The pixel structures of the red light and the blue light are thus hardly visible as shown in FIG. 11B (c) and (e). Since the full pixel shift quantity is 0.8 pixel, black region B is superimposed on pixel section P in the overall region as shown in FIG. 11B (a).

Figure 12A:
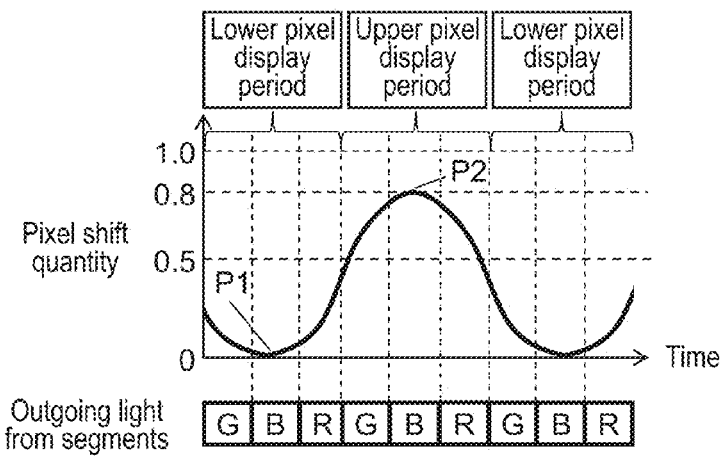
FIG. 12A illustrates performance of pixel shift in an illumination mode (different phase from the foregoing instance) of the projection display apparatus in accordance with the second embodiment.
Figure 12B:
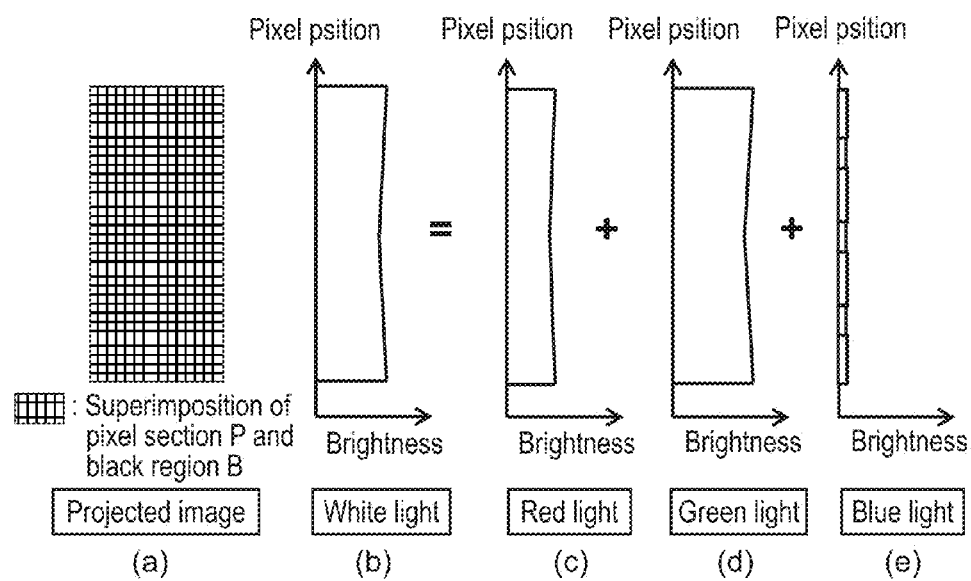
FIG. 12B illustrates brightness levels of a projected image in the illumination mode (a different phase from the foregoing instance) of the projection display apparatus in accordance with the second embodiment.

To be more specific, in the illumination mode in accordance with this second embodiment, as shown in FIG. 12A, the control is done this way: a phase of waveform of pixel shift control is shifted such that blue light of lower brightness is located at the centers of the lower pixel display period and the upper pixel display period of the pixel shift. The control of the pixel shift is done this way: in the sign-waveform representing the relation of time vs. pixel shift quantity, periods close to 0 (zero) pixel and 0.8 pixel where the pixel shift quantities become maximum are allocated to blue light.

In other words, in the illumination mode, as FIG. 12A shows, at a timing when blue light of lower brightness enters from a light source into DMD 136, pixel shift element 400 is controlled such that a pixel is located at the first position (where pixel shift quantity is 0) or at the second position (where pixel shift quantity is 0.8 pixel). That is to say blue light is emitted at peaks P1 and P2 in the sign-waveform representing the relation of time vs. pixel shift quantity.

2-3. Advantage

In this second embodiment, the phase of pixel shift is controlled in response to the timings when red light, green light, and blue light enter DMD 136 from the light source, thereby improving a degree of non-visibility of pixel structure for the illumination application and a degree of the feel of resolution for the image display application.

Third Exemplary Embodiment 3-1. Structure

The third embodiment is demonstrated hereinafter with reference to FIG. 13 and FIG. 14. This third embodiment differs from the first embodiment in a structure in parts shown in the block diagram of the projection display apparatus and in control actions of pixel shift element controller 580. The optical structure per se remains the same as that of the first embodiment. The structural elements similar to those in the first embodiment have the same reference marks and descriptions duplicated are sometimes omitted here.

Figure 13:
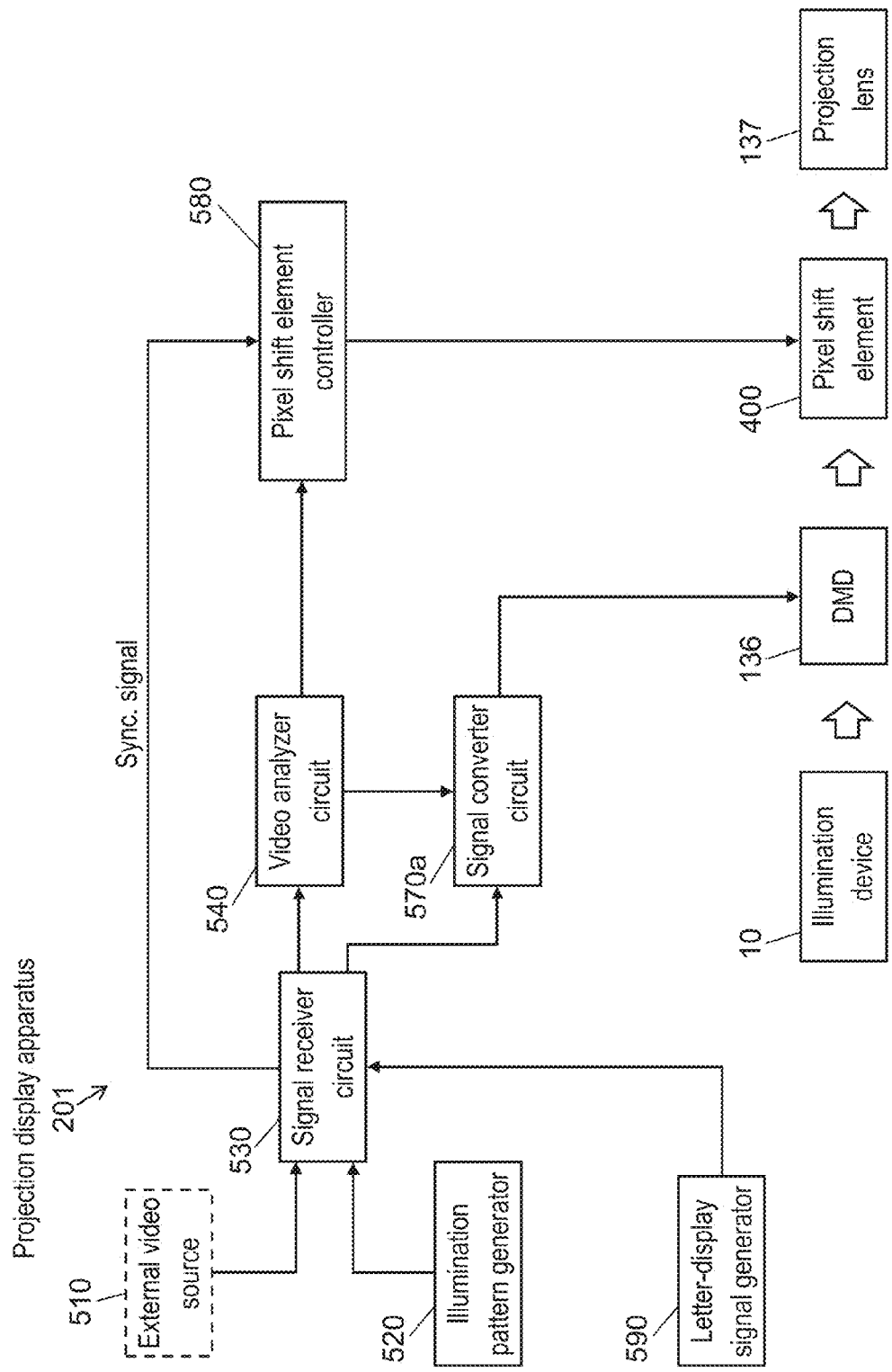
FIG. 13 is a block diagram of a projection display apparatus in accordance with a third embodiment.

FIG. 13 is a block diagram illustrating essential parts of projection display apparatus 201 in accordance with the third embodiment. This block diagram differs from FIG. 6 of the first embodiment in the presences of letter-display signal generator 590 and signal converter circuit 570a, and eliminations of the user input section and the mode switcher circuit.

In the first embodiment previously discussed, the video mode and the illumination mode are available, and different methods for controlling the pixel shift are used in each mode. However, some users need to display letters in a spotlight, where no space is available between pixels (i.e. pixel structure is not visible), to be used in the illumination application. The first embodiment deals with such a case this way: either one of a control waveform of the video mode or a control waveform of the illumination mode is selected. However, this selection causes a trade-off that which one of a spotlight or letters has priority, so that the selection cannot meet a request of displaying both of the spotlight and the letters. To solve this problem, an intermedium control waveform between the video mode and the illumination mode can be created.

Figure 14:
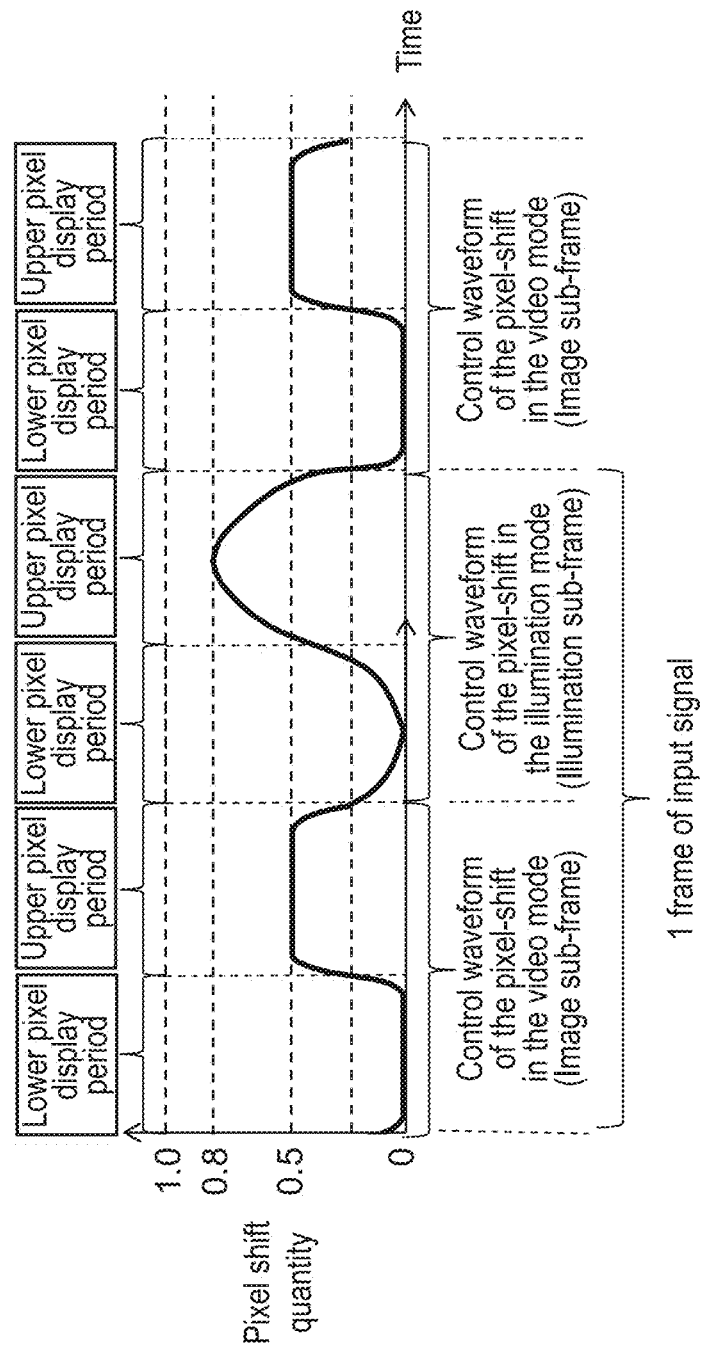
FIG. 14 illustrates performance of pixel shift of the projection display apparatus in accordance with the third embodiment.

In this third embodiment, as FIG. 14 shows, signal converter circuit 570a divides one frame into sub-frames, namely, a sub-frame (image sub-frame) for performing a pixel shift according to a control waveform of the pixel shift in the video mode, and a sub-frame (illumination sub-frame) for performing a pixel shift according to a control waveform of the pixel shift in the illumination mode. The image sub-frame is an example of a sub-frame corresponding to a letter-display period, and the illumination sub-frame is an example of a sub-frame corresponding to an illumination display period.

To be more specific, video analyzer circuit 540 determines whether or not a high-frequency component is available in a signal supplied from signal receiver circuit 530, and when the pixel includes the high-frequency component such as a letter signal supplied from letter-display signal generator 590, this pixel is displayed using the image sub-frames. The pixel shift in this image sub-frame is the second shift performance.

On the other hand, video analyzer circuit 540 determines whether a signal supplied from signal receiver circuit 530 includes a high-frequency component, and when the pixel does not include a high-frequency component such as a signal supplied from illumination pattern generator 520, the pixel is displayed using the illumination sub-frames. The pixel shift in this case is the first shift performance.

3-2. Advantage

This third embodiment proves that in the case of letters being displayed in the illumination mode, projection display apparatus 201 allows the pixel structure to be hardly visible, and yet increases the feel of resolution for the image display.

Other Exemplary Embodiments

The foregoing embodiments are demonstrated as examples of the techniques disclosed in the present application; however, the techniques disclosed here are not limited to these embodiments, and the techniques can be applicable other embodiments including modification, replacement, addition, or omission. On top of that, each of the structural elements discussed in the foregoing embodiments can be combined for establishing new embodiments.

Since the foregoing embodiments exemplify the techniques disclosed in this disclosure, the scope of patent claims or the equivalent scope thereto admits various changes, replacements, additions, or omissions.

In illumination mode 1 or 2 used in the first embodiment, when an illumination signal input into video analyzer circuit 540 is determined that the signal has a high spatial frequency the mode can be automatically switched to the video mode in which pixel shift element 400 is controlled such that the pixel sharply shifts between the first position and the second position.

The optical structure disclosed in this disclosure employs one sheet of DMD; however, an optical system that employs three sheets of DMD can also perform a control similar to the controls done in the foregoing embodiments by using the pixel shift element, and can obtain equivalent advantages.

INDUSTRIAL APPLICABILITY

The present disclosure relates to a projection display apparatus including a video mode and an illumination mode.

What is claimed is:

1. A projection display apparatus comprising:
a light source;
an optical modulator element for modulating incident light from the light source with an input signal;
a projection lens for magnifying and projecting outgoing light from the optical modulator element;
a pixel shift element disposed between the optical modulator element and the projection lens, and displacing an optical path of the outgoing light from the optical modulator element for shifting a display position of a pixel to be displayed on a screen in a given cycle between a first position and a second position away from the first position by a predetermined distance; and
a controller for controlling the pixel shift element in a first mode and a second mode,
wherein the controller controls the pixel shift element such that the pixel shifts between the first position and the second position and the controller operates in one of the first mode at a shift speed or the second mode at another shift speed depending on a received command.

2. The projection display apparatus according to claim 1, wherein the first mode is a video mode in which the optical modulator element modulates the incident light supplied from the light source with a video signal, and emits the light as image light,
the second mode is an illumination mode in which the optical modulator element emits the incident light supplied from the light source as illumination light based on an illumination signal, and the shift speed of the pixel in the illumination mode is slower than the shift speed of the pixel in the video mode.

3. The projection display apparatus according to claim 2, wherein
the controller controls the pixel shift element such that:
in the video mode, the pixel shifts between the first position and the second position in a rising period and a falling period of a rectangular waveform that represents a relation of time vs. pixel shift quantity, and
in the illumination mode, the pixel shifts between the first position and the second position in a peak-to-peak period within a half cycle of a sign-waveform that represents a relation of time vs. pixel shift quantity.

4. The projection display apparatus according to claim 2, wherein
the controller controls the pixel shift element such that the pixel shift quantity in the illumination mode differs from the pixel shift quantity in the video mode.

5. The projection display apparatus according to claim 2, wherein
the controller controls the pixel shift element such that, in the illumination mode, the pixel is located at the first position or at the second position at a timing when color light of low brightness enters the optical modulator element from the light source.

6. The projection display apparatus according to claim 2 further comprising a spatial frequency detector that determines whether the input signal is in the video mode or in the illumination mode based on a spatial frequency of the input signal,
wherein the controller controls the pixel shift element based on the determination done by the spatial frequency detector.

7. The projection display apparatus according to claim 2 further comprising a letter-display signal generator,
wherein a letter display period and an illumination display period are provided in the given cycle,
wherein the optical modulator element emits display light based on a letter signal supplied from the letter-display signal generator in the letter display period, and emits illumination light based on the illumination signal in the illumination display period, and
wherein the controller controls the pixel shift element in the video mode during the letter display period, and in the illumination mode during the illumination display period.

8. The projection display apparatus according to claim 1, further comprising a detector which detects a characteristic of the input signal to provide a result, the received command is issued in response to the result.

9. The projection display apparatus according to claim 1, wherein
a plurality of pixels are displayed on the screen,
each of the plurality of pixels is formed of a pixel section and a black region that is observed between pixel sections adjacent to each other, and
the pixel section is larger than the black region.

* * * * *